United States Patent
Ban et al.

(10) Patent No.: US 8,254,350 B2
(45) Date of Patent: Aug. 28, 2012

(54) ROUTING PACKETS IN AN AD HOC WIRELESS NETWORK

(75) Inventors: Oliver Keren Ban, Austin, TX (US);
Timothy Alan Dietz, Austin, TX (US);
John S. Maresca, Hopewell Junction, NY (US); Anthony Cappa Spielberg, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1037 days.

(21) Appl. No.: 11/762,941

(22) Filed: Jun. 14, 2007

(65) Prior Publication Data

US 2008/0310376 A1 Dec. 18, 2008

(51) Int. Cl.
*H04L 12/56* (2006.01)
(52) U.S. Cl. .................. 370/338; 455/456.1; 455/435.1
(58) Field of Classification Search .......... 370/328–350; 455/40–43, 550.1–556.2
See application file for complete search history.

(56) References Cited

U.S. PATENT DOCUMENTS

| 6,763,014 | B2 | 7/2004 | Kennedy |
| 6,816,460 | B1 * | 11/2004 | Ahmed et al. ............... 370/238 |
| 6,888,936 | B1 * | 5/2005 | Groen et al. ............... 379/207.12 |
| 7,006,453 | B1 * | 2/2006 | Ahmed et al. ............... 370/255 |
| 2003/0079003 | A1 | 4/2003 | Burr |
| 2003/0117966 | A1 * | 6/2003 | Chen ............... 370/255 |
| 2004/0147223 | A1 * | 7/2004 | Cho ............... 455/41.2 |
| 2005/0143096 | A1 | 6/2005 | Boesch |
| 2006/0135067 | A1 * | 6/2006 | Dunko ............... 455/456.1 |
| 2007/0010248 | A1 | 1/2007 | Dravida et al. |
| 2008/0186871 | A1 * | 8/2008 | Trevino et al. ............... 370/252 |

OTHER PUBLICATIONS

Basagni et al. "A Distance Routing Effect Algorithm for Mobility (DREAM)." MOBICOM 98 Dallas, Texas USA. 1998.*
Kojima et al., "System Configuration for Private Mobile Network Using Slotted-Aloha Based Autonomous Packet Routing", PIMRC 2002 IEEE, pp. 1-5.
Roth et al., "Termite: A Swarm Intelligent Routing Algorithm for Mobile Wireless Ad-Hoc Networks", School of Electrical and Computer Engineering, Cornell University, pp. 1-32.
Ko et al., "Location-Aided Routing (LAR) in mobile ad hoc networks", Wireless Networks 6 (2000), pp. 307-321.

* cited by examiner

*Primary Examiner* — Kamran Afshar
*Assistant Examiner* — Kashif Siddiqui
(74) *Attorney, Agent, or Firm* — Yee & Associates, P.C.; Steven L. Bennett

(57) ABSTRACT

A system for routing packets in an ad hoc wireless network. In response to entering the ad hoc wireless network, location data is broadcast to other nodes within the ad hoc wireless network. Location data is received from the other nodes within the ad hoc wireless network. The received location data is recorded in a routing table. In response to determining that one or more packets need to be transmitted, a best route is calculated to transmit the one or more packets within the ad hoc wireless network using data in the routing table. Then, the one or more packets are transmitted to a node within the ad hoc wireless network based on the calculated best route.

24 Claims, 3 Drawing Sheets

ROUTING PACKETS IN AN AD HOC WIRELESS NETWORK

BACKGROUND OF THE INVENTION

1. Field of the Invention

The present invention relates generally to an improved data processing system. More specifically, the present invention is directed to a computer implemented method, system, and computer usable program code for intelligently routing packets in an ad hoc wireless network among a plurality of mobile communication devices.

2. Description of the Related Art

Today, computer systems are becoming increasingly pervasive in our society. These pervasive computer systems include small handheld mobile communication devices, such as cellular telephones and personal data assistants (PDAs). Instead of just signal processors, these mobile communication devices have evolved into powerful computing platforms, which have data processing capabilities, as well as other functionalities, such as position detection.

Typically, the duty cycle of these mobile communication devices is quite small, focusing on brief, on-demand activities, such as sending and receiving voice or text messages. Or, a 911 operator may use the position detection function to locate a user of the calling mobile communication device only in an emergency situation. Consequently, the data processing capabilities and other functionalities of these mobile communication devices are vastly under utilized. Furthermore, these mobile communication devices are becoming ubiquitous in our society and, via "always on" connections, these mobile communication devices are becoming accessible to networks of other devices. However, currently there is no good method for using these under utilized data processing and position detection capabilities to facilitate communication between a plurality of mobile communication devices in an ad hoc network.

Therefore, it would be beneficial to have an improved computer implemented method, system, and computer usable program code for intelligently routing packets in an ad hoc wireless network among a plurality of mobile communication devices that include an enabled position detection function.

BRIEF SUMMARY OF THE INVENTION

Illustrative embodiments provide a computer implemented method, system, and computer usable program code for routing packets in an ad hoc wireless network. In response to entering the ad hoc wireless network, location data is broadcast to other nodes within the ad hoc wireless network. Then, location data is received from the other nodes within the ad hoc wireless network. The received location data is recorded in a routing table. In response to determining that one or more packets need to be transmitted, a best route is calculated to transmit the one or more packets within the ad hoc wireless network using data in the routing table. Then, the one or more packets are transmitted to a node within the ad hoc wireless network based on the calculated best route.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE INVENTION

Figure 1:
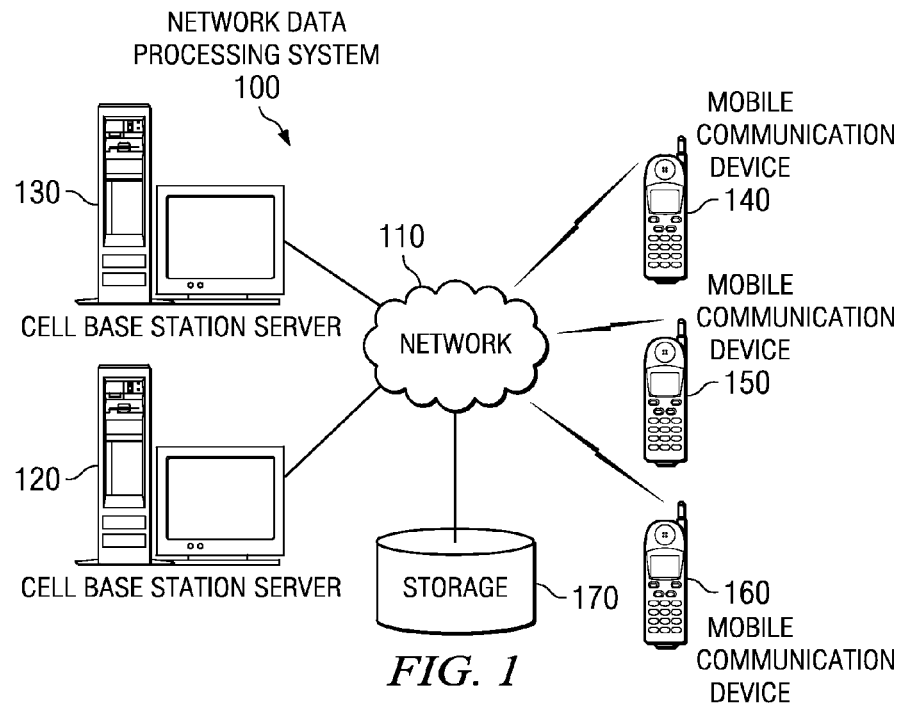
FIG. 1 is a pictorial representation of a network of data processing systems in which illustrative embodiments may be implemented.

With reference now to the figures, FIG. 1 depicts a pictorial representation of a network of data processing systems in which illustrative embodiments may be implemented. Network data processing system 100 is a network of computers in which illustrative embodiments may be implemented. Network data processing system 100 contains network 110, which is the medium used to provide communication links between the various computers and other devices coupled together within network data processing system 100. Network 110 may include several types of connections, such as wire, wireless communication links, or fiber optic cables. However, for this illustrative embodiment depicted in FIG. 1, wireless communication links are emphasized.

In the depicted example of FIG. 1, cell base station server 120 and cell base station server 130 are coupled to network 110 by wire or wireless communication links. Cell base station servers 120 and 130 may, for example, be communication servers with high speed connections to network 110. Also, cell base station servers 120 and 130 may represent a plurality of communication servers located within a local area network (LAN) or a wide area network (WAN). Further, cell base station servers 120 and 130 may, for example, reside within a cellular telephone service provider (SP) network. In another illustrative embodiment, cell base station servers 120 and 130 may, for example, independently or in combination provide communication services for a plurality of cellular telephone SP networks.

Mobile communication devices 140, 150, and 160 are coupled to network 110 via wireless means. In addition, mobile communication devices 140, 150, and 160 are clients to cell base station servers 120 and 130. In this illustrative example, mobile communication devices 140, 150, and 160 are cellular telephones relying on wireless communication links.

However, it should be noted that besides being cellular telephones, the mobile communication devices shown in FIG. 1 may, for example, be PDAs, handheld gaming devices, handheld computers, or laptop computers that rely on wireless communication links. Furthermore, illustrative embodiments are not restricted to the above-listed mobile communication devices. Illustrative embodiments may utilize any mobile communication device that is capable of accomplishing processes of illustrative embodiments.

Storage unit 170 also is coupled to network 110 and represents any type of storage device that is capable of storing data in a structured and/or unstructured format. Also, storage unit 170 may represent a plurality of storage units coupled to network 110. Storage unit 170 may, for example, be a database for a cellular telephone SP network that contains customer information, such as customer names, addresses, telephone numbers, and personal profile data.

Further, storage unit 170 also may contain one or more routing tables and location data for a plurality of mobile communication devices and cell base station servers. A mobile communication device or a cell base station server may use a routing table to, for example, determine the best route to transmit one or more packets between a plurality of mobile communication devices, such as mobile communication devices 140, 150, and 160, within a communication grid, such as network 110. Further, a mobile communication device or a cell base station server may use the location data to, for example, specifically locate another mobile communication device or cell base station server within network 110.

Additionally, network data processing system 100 may, for example, include additional servers, clients, storage units, and other devices not shown. Moreover, network data processing system 100 may, for example, represent the Internet with network 110 representing a worldwide collection of networks and gateways that use the transmission control protocol/internet protocol (TCP/IP) suite of protocols to communicate with one another. Internet protocol (IP) telephony is the two-way transmission of voice over a packet-switched IP network, which is part of the TCP/IP suite of protocols. The terms "IP telephony" and "voice over IP" (VoIP) are synonymous. VoIP is a telephone service that uses the Internet as a global telephone network. At the heart of the Internet is a backbone of high-speed data communication lines between major nodes or host computers, consisting of thousands of commercial, government, educational, and other computer systems that route data and messages.

It should be appreciated by those of ordinary skill in the art that FIG. 1 is only intended as an exemplary illustration and is not intended as an architectural limitation for illustrative embodiments. Further, it should be appreciated by those of ordinary skill in the art that even though the example of FIG. 1 depicts a cellular telephone network, illustrative embodiments may be utilized by any type of wireless/mobile system.

Figure 2:
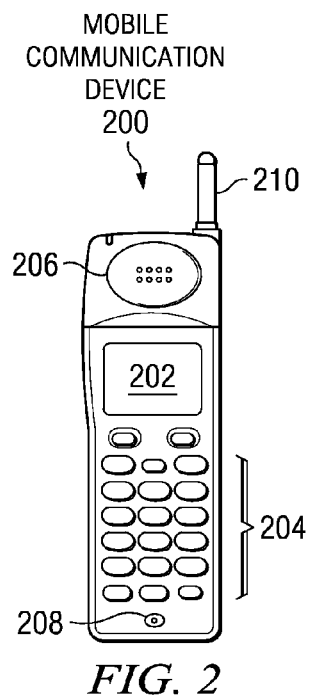
FIG. 2 is a pictorial representation of a mobile communication device in which illustrative embodiments may be implemented.

With reference now to FIG. 2, a pictorial representation of a mobile communication device is depicted in which illustrative embodiments may be implemented. In the illustrative example of FIG. 2, mobile communication device 200 is a cellular telephone. Mobile communication device 200 may, for example, be mobile communication device 140 in FIG. 1. However, illustrative embodiments may utilize any type of wirelessly enabled mobile communication device, such as a PDA, a handheld computer, a handheld gaming device, or a laptop computer, to accomplish processes of illustrative embodiments.

Mobile communication device 200 includes display 202 to present textual and graphical information to a user. Display 202 may be a known display device, such as a liquid crystal display (LCD) or an organic light-emitting diode (OLED) display. Mobile communication device 200 also includes keypad 204, speaker 206, and microphone 208. A user may utilize keypad 204 to enter telephone numbers, user identification information, and commands for interacting with the interface. Mobile communication device 200 may present audio feedback via speaker 206. A user may utilize microphone 208 not only for voice communication, but also for entering specific voice commands for voice actuated functions. Further, mobile communication device 200 uses antenna 210 to establish wireless communication links with a network, such as, for example, network 110 in FIG. 1. However, it should be noted that even though antenna 210 is shown as an external antenna, antenna 210 may represent an internal antenna as well.

Illustrative embodiments provide a computer implemented method, system, and computer usable program code for intelligently routing packets within an ad hoc wireless network among a plurality of mobile communication devices. The plurality of mobile communication devices may, for example, be a plurality of cellular telephones. Also, the mobile communication devices may be PDAs, handheld gaming devices, handheld computes, laptop computers, or any combination thereof, which are wirelessly enabled.

In response to entering the ad hoc wireless network, the mobile communication device broadcasts location data to other nodes within the ad hoc wireless network. Then, the mobile communication device receives location data from the other nodes within the ad hoc wireless network. The mobile communication device records the received location data in a routing table. In response to determining that one or more packets need to be transmitted, the mobile communication device uses an intelligent router unit to calculate a best route to transmit the one or more packets within the ad hoc wireless network using data in the routing table. The best route may, for example, be to transmit or relay the one or more packets to the nearest mobile communication device within the ad hoc wireless network. Alternatively, the best route may be to transmit or relay the one or more packets over a route with the least amount of traffic. Illustrative embodiments may utilize a known routing algorithm to calculate the best route. Subsequently, the mobile communication device transmits the one or more packets to a node within the ad hoc wireless network based on the calculated best route.

In general, a cellular telephone network divides a geographical area of service into cells. Each cell includes a cell base station that uses wireless transmission technologies to provide services to mobile users in its area. A mobile ad hoc wireless network is an autonomous system of computer systems, such as mobile communication devices, and associated host computer systems, such as cell base station servers, coupled via wireless links, the union of which forms an arbitrary communication grid. In contrast to the typically envisioned computer network, the computer systems within the ad hoc wireless network are free to randomly move and arbitrarily organize themselves.

Each mobile communication device within the ad hoc wireless network may send its own messages or may also function as a router to route messages sent by other mobile communication devices within the ad hoc wireless network. In addition, every node within the ad hoc wireless network may communicate with every other device within the ad hoc wireless network. It should be noted that mobile communication devices and cell base station servers within the ad hoc wireless network may be referred to as nodes or devices. Further, the ad hoc wireless network may operate as an independent network or may be coupled to a larger internet.

The ad hoc wireless network is formed when a plurality of devices share location data among each other. By sharing the location data, such as, for example, global position system (GPS) and/or base station triangulation data, among every node in the ad hoc wireless network, the routing code inside an intelligent router unit in the devices may be intelligently generated on the fly instead of using a trial and error approach used by prior art designs. Thus, every node within the ad hoc wireless network becomes a "base station" or a self-directed intelligent router.

If a node uses a GPS method to obtain location data, the node includes a GPS transceiver to determine the exact location of the node. GPS is a radio navigation system run by the Department of Defense. By triangulation of signals from three of the twenty-four GPS satellites, the GPS transceiver may pinpoint the node's current location anywhere on earth.

There are two ways for a node to obtain location data using the base station triangulation method. First, the node may be totally passive. If the node is passive, then three or more cell base station servers using a three point locating algorithm may define the node's location. Second, the node may actively transmit signals. If the node is active, the signals may hook three or more base station servers to allow for geographical location of the node.

Consequently, a node may use the GPS method and/or the base station triangulation method to obtain current location data. However, no matter which method a node may use to obtain the location data, the routing header in every packet includes the obtained location data for transmission.

Physically, a mobile ad hoc network includes a number of geographically-distributed, potentially mobile nodes wirelessly coupled by one or more radio frequency channels. The mobile nodes create and form the ad hoc wireless network on the fly as nodes transmit packets to or receive packets from other nodes within the ad hoc wireless network. The ad hoc wireless network does not depend on any one particular node to function and dynamically adjusts as nodes join and/or leave the ad hoc wireless network.

Thus, an ad hoc wireless network may allow people to exchange data, for example, in "the field" or in a classroom, without using any network structure except the one they create by simply turning on their mobile communication devices. However, the distance between two nodes may exceed the radio transmission range, so packet transmission may be relayed by one or more other nodes within the ad hoc wireless network before the packets reach their final destination. Consequently, the ad hoc wireless network may use a multi-hop topology. However, this topology may frequently change as nodes move within the ad hoc wireless network. Thus, the routing protocol adapts on the fly to the frequent topology changes in the ad hoc wireless network.

When a mobile communication device enters the ad hoc wireless network, the mobile electronic device broadcasts location data, which is obtained either by the GPS method or by the base station triangulation method, to the other nodes within the ad hoc wireless network. The other nodes in the ad hoc wireless network record the location data, as well as the node's identification data. In addition, the other nodes broadcast their location and identification data to the entering mobile communication device.

When determining the next packet routing destination, the mobile communication device may use, for example, a calculated nearest destination route algorithm, instead of a random broadcast to route the packet. If a packet is lost or a node is disabled, the routing path may always be changed on the fly without interference from a base station. Thus, a much intelligent network is formed.

As a result, illustrative embodiments are able to provide a more robust ad hoc wireless network capable of faster disaster recovery. In addition, illustrative embodiments are more fault tolerant to node partial disability and base station malfunction. Further, illustrative embodiments execute in the background so that users of mobile communication devices so enabled are not aware of processes of illustrative embodiments during use. Furthermore, a cellular network SP may, for example, reward a mobile communication device that is equipped with an illustrative embodiment and serves as a cell base station within the network with free air time minutes, free optional services, and/or reduced monthly service fees.

Figure 3:
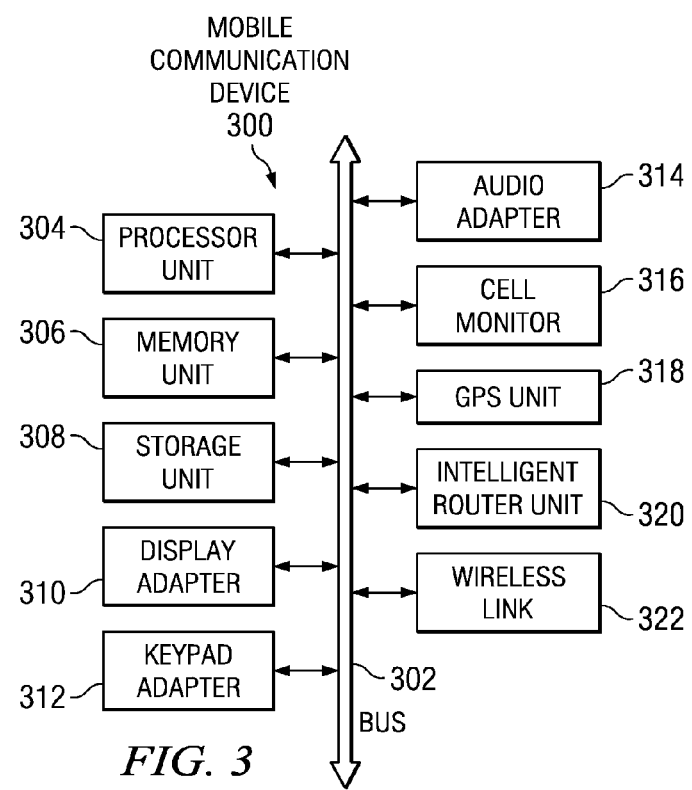
FIG. 3 is a block diagram of components of a mobile communication device in accordance with an illustrative embodiment.

With reference now to FIG. 3, a block diagram of components of a mobile communication device is depicted in accordance with an illustrative embodiment. In the illustrative example of FIG. 3, mobile communication device 300 may, for example, be implemented in mobile communication device 200 in FIG. 2. However, it should be noted that illustrative embodiments may be implemented in any type of wirelessly enabled mobile communication device, such as a cellular telephone, a PDA, a handheld computer, a handheld gaming device, or a laptop computer, to accomplish processes of illustrative embodiments.

In the illustrative example of FIG. 3, mobile communication device 300 utilizes a bus architecture, such as bus 302. Bus 302 may include one or more buses. In addition, bus 302 may be implemented using any type of communication fabric or architecture that provides for a transfer of data between the different components or devices coupled to bus 302.

Mobile communication device 300 includes processor unit 304, memory unit 306, storage unit 308, display adapter 310, keypad adapter 312, audio adapter 314, cell monitor 316, GPS unit 318, intelligent router unit 320, and wireless link 322, which are coupled to bus 302. However, it should be noted that mobile communication device 300 is only shown for exemplary purposes and is not meant as an architectural limitation to illustrative embodiments. Mobile communication device 300 may include more or fewer components as necessary to perform processes of illustrative embodiments.

Processor unit 304 provides the data processing capabilities of mobile communication device 300. An operating system runs on processor unit 304 and coordinates and provides control of various components within mobile communication device 300. In addition, software applications executing on mobile communication device 300 may run in conjunction with the operating system.

Storage unit 308 is a non-volatile storage device that may, for example, be configured as read only memory (ROM) and/or flash ROM to provide the non-volatile memory for storing the operating system, applications, and/or user-generated data. Storage unit 308 also stores instructions or computer usable program code for the operating system, applications, and illustrative embodiments. The instructions are loaded into memory unit 306 for execution by processor unit 304. Processor unit 304 performs processes of illustrative embodiments by executing the computer usable program code that is loaded into memory unit 306.

However, it should be noted that mobile communication device 300 may store data in a remote storage device, such as, for example, storage 170 in FIG. 1, in addition to or instead of storage unit 308. In addition, storage unit 308 may contain any data necessary for processes of illustrative embodiments to provide on the fly intelligent routing of packets within an ad hoc wireless network by a mobile communication device.

Mobile communication device 300 uses cell monitor 316 to stay in almost constant communication with other mobile communication devices and cell base station servers, such as mobile communication devices 150 and 160 and cell base station servers 120 and 130 in FIG. 1, within an ad hoc wireless network. Cell monitor 316 transmits, for example, identification and location data for mobile communication device 300 to the other mobile communication devices and cell base station servers within an ad hoc wireless network. The identification data is data that uniquely identifies mobile communication device 300. The location data is data that specifically locates mobile communication device 300 geographically within an ad hoc wireless network.

Cell monitor 316 may transmit the location data, for example, on a predetermined time interval basis or on an as needed basis. The predetermined time interval may, for example, be once every one-quarter second, one-half second, three-quarter second, one second, five seconds, or ten seconds. However, the preceding list of time intervals is only meant as an example and not as a limitation on illustrative embodiments. In other words, illustrative embodiments may utilize any predetermined interval of time to transmit location data. In addition, cell monitor 316 may transmit location data on-demand by a user of mobile communication device 300. Mobile communication device 300 uses GPS unit 318 to provide the location data to cell monitor 316 for transmission.

Mobile communication device 300 uses intelligent router unit 320 to receive identification and location data for the other nodes in the ad hoc wireless network. Intelligent router unit 320 records the received identification and location data for the other nodes in a routing table. Intelligent router unit 320 uses the data contained within the routing table to intelligently route packets on the fly from mobile communication device 300 to another node within the ad hoc wireless network. As intelligent router unit 320 continues to receive location data from the plurality of other nodes within the ad hoc wireless network, intelligent router unit 320 updates the routing table to maintain up-to-date routing information for determining a best route for packet transmission.

Wireless link 324 may, for example, utilize shortwave, high frequency, ultra high frequency, microwave, wireless fidelity (Wi-Fi™), Bluetooth® technology, or any other wireless communication means to establish a wireless communication link for mobile electronic device 300. Mobile electronic device 300 also may rely on wireless application protocol (WAP) for facilitating communications. Wireless application protocol is a standard for providing wireless phones, pagers, and other handheld devices with secure access to e-mail and text-based Web pages. Wireless application protocol provides a complete environment for wireless applications that includes a wireless counterpart of TCP/IP and a framework for telephony integration, such as call control and phone book access. Wireless application protocol features the wireless markup language (WML), which was derived from Phone.com's handheld device markup language (HDML) and is a streamlined version of hypertext markup language (HTML) for small screen displays. Also, wireless application protocol uses WMLScript, a compact JavaScript-like language that runs in limited memory. Additionally, wireless application protocol supports handheld input methods, such as keypad and voice recognition.

Wireless application protocol runs over all the major wireless networks now in place. Also, wireless application protocol is device independent, requiring only a minimum functionality in the unit so that it may be used with a myriad of cellular phones and handheld devices. However, it should be pointed out that wireless application protocol has been described for illustrative purposes, and other wireless protocols may be used to implement illustrative embodiments.

Furthermore, it should be noted that a user of mobile communication device 300 may enable and disable processes of illustrative embodiments independently of other mobile communication device 300 functions and features. Moreover, it should be noted that processes of illustrative embodiments may be implemented entirely as software, hardware, or as a combination of software and hardware components.

Those of ordinary skill in the art will appreciate that the components depicted in FIG. 3 may vary depending on implementation of illustrative embodiments. Other internal components or peripheral devices may be used in addition to or in place of the components shown in FIG. 3. For example, mobile communication device 300 also may include a voice recognition system in order to perform functions activated by user voice command.

Figure 4:
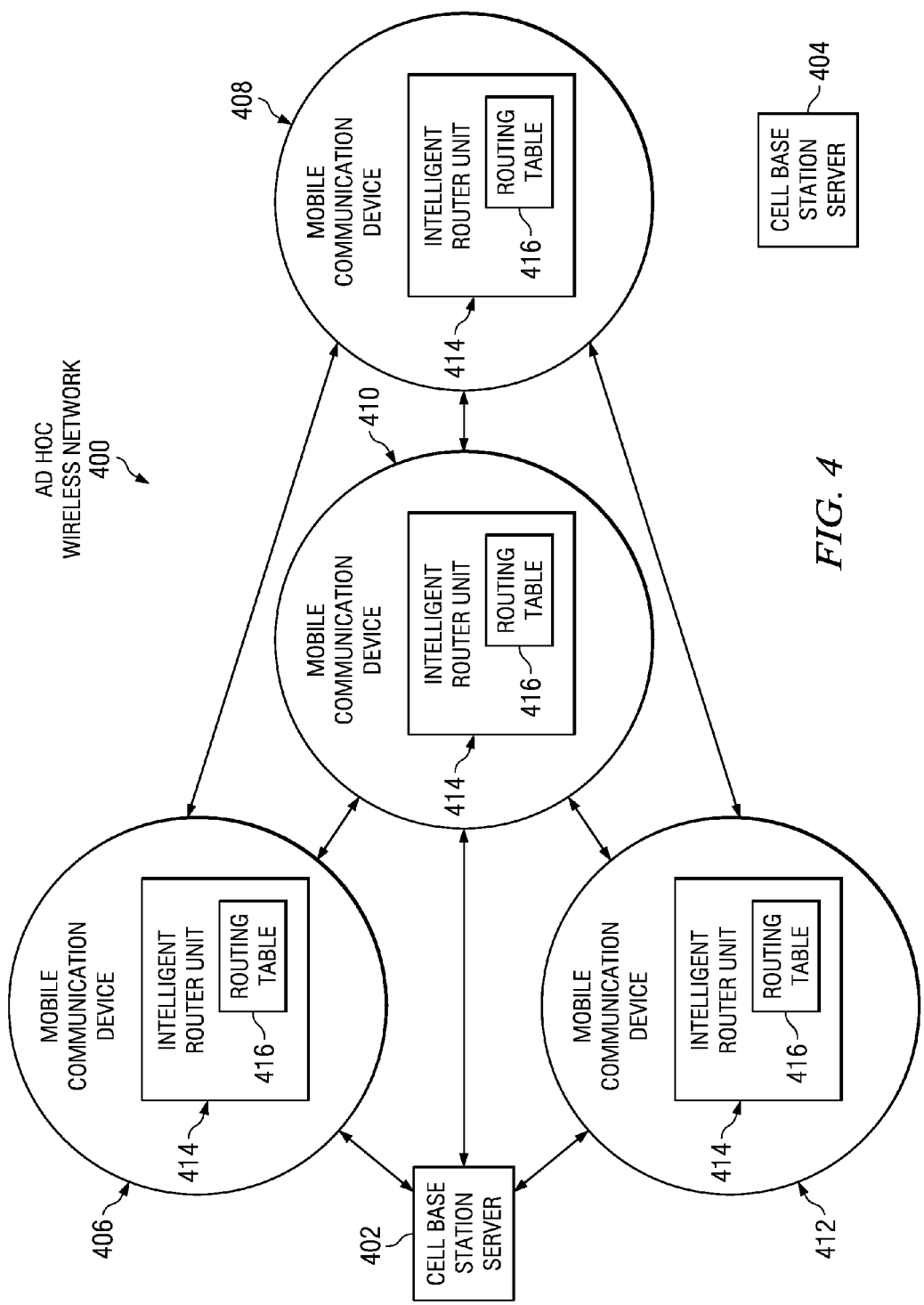
FIG. 4 is an exemplary illustration of an ad hoc wireless network in accordance with an illustrative embodiment.

With reference now to FIG. 4, an exemplary illustration of an ad hoc wireless network is depicted in accordance with an illustrative embodiment. Ad hoc wireless network 400 may, for example, be implemented in network data processing system 100 in FIG. 1. Ad hoc wireless network 400 includes cell base station servers 402 and 404 and mobile communication devices 406, 408, 410, and 412, such as, for example, cell base station servers 120 and 130 and mobile communication devices 140, 150, and 160 in FIG. 1.

As shown in this example of FIG. 4, mobile communication devices 406, 408, 410, and 412 and cell base station server 402 are coupled together within ad hoc wireless network 400 and may directly communication with each other. Mobile communication devices 406, 408, 410, and 412 include intelligent router unit 414, such as, for example, intelligent router unit 320 in FIG. 3. Mobile communication devices 406, 408, 410, and 412 utilize intelligent router unit 414 to make intelligent packet routing decisions on the fly as mobile communication devices 406, 408, 410, and 412 move within ad hoc wireless network 400, thereby changing the topology of the network.

In order for intelligent router unit 414 to make intelligent packet routing decisions for mobile communication devices 406, 408, 410, and 412 within ad hoc wireless network 400, intelligent router unit 414 must have current location data for each of the nodes. Consequently, mobile communication devices 406, 408, 410, and 412 broadcast location and identification data on a predetermined time interval basis to the other nodes within ad hoc wireless network 400. Intelligent router unit 414 receives this location and identification data from the other nodes and records the information in routing table 416. In addition, intelligent router unit 414 continually updates routing table 416 as intelligent router unit 414 continues to receive new location data for the other nodes within ad hoc wireless network 400.

Intelligent router unit 414 uses the data contained in routing table 416 to determine the best route to transmit or relay a packet to increase efficiency of packet transmission within ad hoc wireless network 400. It should be noted that cell base station servers 402 and 404 also may include intelligent router unit 414.

Figure 5:
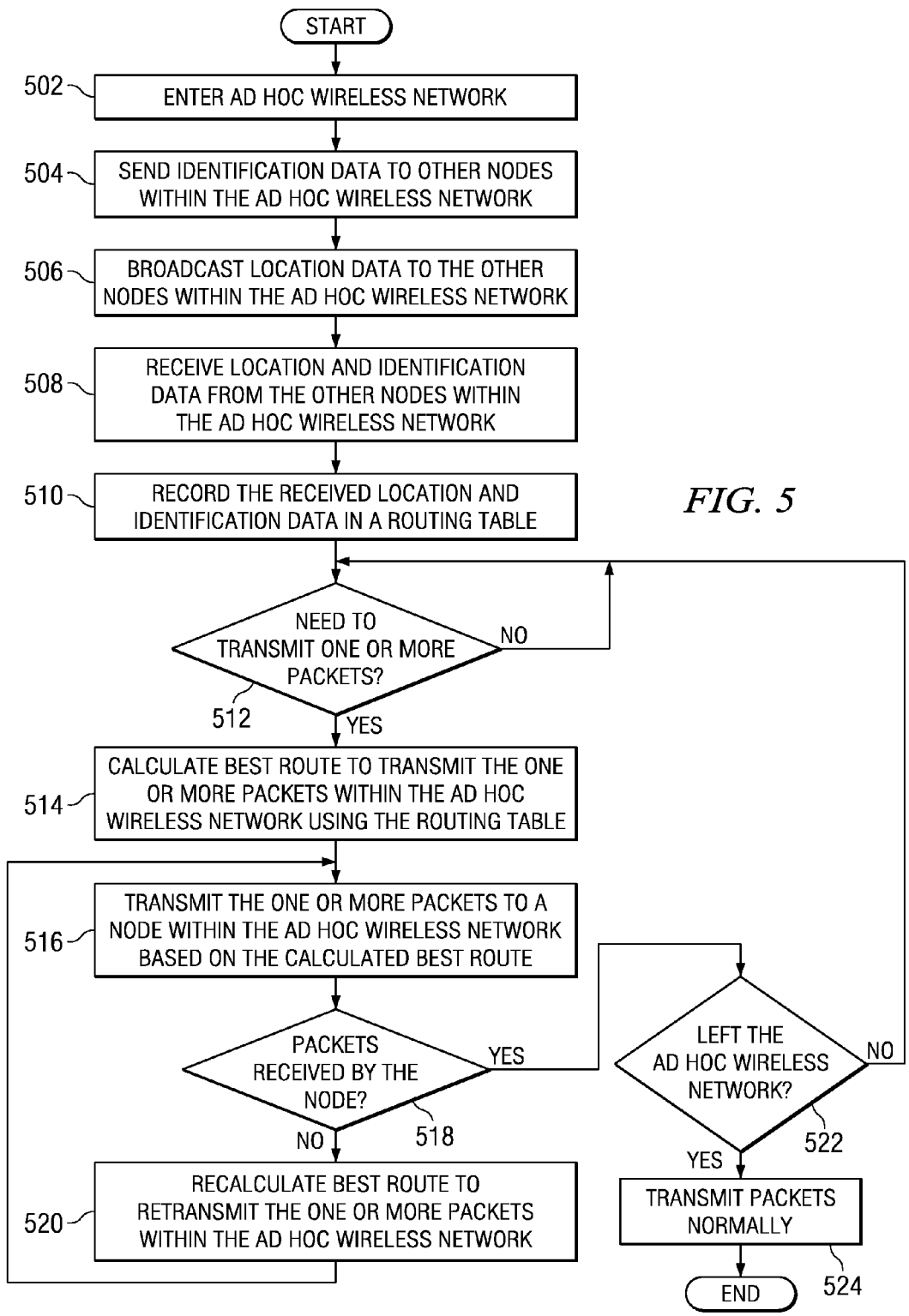
FIG. 5 is a flowchart illustrating an exemplary process for routing packets in an ad hoc wireless network in accordance with an illustrative embodiment.

With reference now to FIG. 5, a flowchart illustrating an exemplary process for routing packets in an ad hoc wireless network is shown in accordance with an illustrative embodiment. The process shown in FIG. 5 may be implemented in a mobile communication device, such as, for example, mobile communication device 406 in FIG. 4.

The process begins when the mobile communication device enters an ad hoc wireless network, such as, for example, ad hoc wireless network 400 in FIG. 4 (step 502). Subsequent to entering the ad hoc wireless network in step 502, the mobile communication device uses a cell monitor, such as, for example, cell monitor 316 in FIG. 3, to send identification data for the mobile communication device to other nodes within the ad hoc wireless network (step 504). The mobile communication device sends the identification data as an "announcement" of the mobile communication device's presence within the ad hoc wireless network to the other nodes. In addition, the identification data uniquely identifies the mobile communication device within the ad hoc wireless network. The other nodes in the ad hoc wireless network may, for example, be a cell base station server and a plurality of other mobile communication devices, such as cell base station server 402 and mobile communication devices 408, 410, and 412 in FIG. 4.

Afterward, the mobile communication device uses the cell monitor to broadcast location data for the mobile communication device to the other nodes within the ad hoc wireless network (step 506). The location data specifically locates the position of the mobile communication device within the ad hoc wireless network for packet routing purposes. Then, the mobile communication device uses an intelligent router unit, such as, for example, intelligent router unit 414 in FIG. 4, to receive location and identification data from the other nodes within the ad hoc wireless network (step 508). Subsequently, the intelligent router unit records the received location and identification data for the other nodes in a routing table (step 510).

It should be noted that while the mobile communication device remains in the ad hoc wireless network, the mobile communication device continues to perform steps 506, 508, and 510. For example, the nodes within the ad hoc wireless network may continue to broadcast location data on a predetermined time interval basis. Consequently, the mobile communication device may continually update the routing table as the mobile communication device continues to receive new location data from the other nodes.

Then, the mobile communication device makes a determination as to whether the mobile communication device needs to transmit one or more packets (step 512). It should be noted that the mobile communication device, itself, may generate the one or more packets for transmission. Alternatively, the mobile communication device may receive the one or more packets for transmission from one of the other nodes within the ad hoc wireless network. In the latter case, the mobile communication device acts as a cell base station to relay packet transmissions from another node within the ad hoc wireless network.

If the mobile communication device does not need to transmit one or more packets, no output of step 512, then the process returns to step 512 where the mobile communication device waits for one or more packets to transmit. If the mobile communication device does need to transmit one or more packets, yes output of step 512, then the mobile communication device uses the intelligent router unit to calculate a best route to transmit the one or more packets within the ad hoc wireless network using data in the routing table (step 514). Afterward, the mobile communication device transmits the one or more packets to a node within the ad hoc wireless network based on the calculated best route (step 516).

Subsequently, the mobile communication device makes a determination as to whether the node received the one or more packets (step 518). If the node did not receive the one or more packets, no output of step 518, then the intelligent router unit recalculates the best route to retransmit the one or more packets within the ad hoc wireless network (step 520). It should be noted that the node may not have received the one or more packets because the one or more packets may have been lost, corrupted, or destroyed or the node may have left the ad hoc wireless network. The process returns to step 516 thereafter, where the mobile communication device retransmits the one or more packets to a node within the ad hoc wireless network based on the recalculated best route.

If the node did receive the one or more packets, yes output of step 518, then the mobile communication device uses the cell monitor to make a determination as to whether the mobile communication device left the ad hoc wireless network (step 522). If the mobile communication device did not leave the ad hoc wireless network, no output of step 522, then the process returns to step 512 where the mobile communication device makes a determination as to whether the mobile communication device needs to transmit one or more packets. If the mobile communication device did leave the ad hoc wireless network, yes output of step 522, then the mobile communication device transmits packets normally (step 524). The process terminates thereafter.

Thus, illustrative embodiments provide an improved computer implemented method, system, and computer usable program code for routing packets in an ad hoc wireless network. The invention may take the form of an entirely hardware embodiment, an entirely software embodiment, or an embodiment containing both hardware and software elements. In a preferred embodiment, the invention is implemented in software, which includes but is not limited to firmware, resident software, microcode, etc.

Furthermore, the invention may take the form of a computer program product accessible from a computer-usable or computer-readable medium providing program code for use by or in connection with a computer or any instruction execution system. For the purposes of this description, a computer-usable or computer-readable medium may be any tangible apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Further, a computer storage medium may contain or store a computer readable program code such that when the computer readable program code is executed on a computer, the execution of this computer readable program code causes the computer to transmit another computer readable program code over a communications link. This communications link may use a medium that is, for example without limitation, physical or wireless.

A data processing system suitable for storing and/or executing program code will include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for routing packets in an ad hoc wireless network, the method comprising:
    responsive to entering the ad hoc wireless network, a mobile communication device of a plurality of mobile communication devices within the ad hoc wireless network broadcasting location data to other nodes within the ad hoc wireless network;
    the mobile communication device receiving location data from the other nodes within the ad hoc wireless network to form received location data;
    the mobile communication device recording the received location data in a routing table in a remote storage device coupled to the ad hoc wireless network;
    responsive to determining that one or more packets need to be transmitted, the mobile communication device retrieving the routing table from the remote storage device and calculating a best route to transmit the one or more packets within the ad hoc wireless network using data in the routing table to form a calculated best route, wherein the calculated best route comprises one of transmitting or relaying the one or more packets to a nearest mobile communications device within the ad hoc wireless network and transmitting or relaying the one or more packets over a route with a least amount of traffic; and
    the mobile communication device transmitting the one or more packets to a node within the ad hoc wireless network based on the calculated best route.

2. The method of claim 1, further comprising:
    the mobile communication device determining if the one or more packets were received by the node; and
    responsive to determining that the one or more packets were not received by the node, the mobile communication device recalculating the best route to transmit the one or more packets within the ad hoc wireless network.

3. The method of claim 2, wherein the calculating and recalculating steps are performed by the mobile communication device on the fly to intelligently route the one or more packets as a topology of the ad hoc wireless network changes.

4. The method of claim 1, wherein the mobile communication device is a cellular telephone, and wherein the cellular telephone is one of a plurality of cellular telephones within the ad hoc wireless network.

5. The method of claim 1, wherein the mobile communication device is one of a personal digital assistant, a hand-held gaming device, a hand-held computer, or a laptop computer that is wirelessly enabled.

6. The method of claim 4, wherein the plurality of cellular telephones include a global position system unit, and wherein the global position system unit provides the location data for the plurality of cellular telephones to broadcast to each of the other nodes within the ad hoc wireless network.

7. The method of claim 6, wherein each of the plurality of cellular telephones broadcast the location data to each of the other nodes within the ad hoc wireless network on a predetermined time interval basis and in response to receiving a command from a user of the mobile communication device to transmit location data.

8. The method of claim 4, wherein the plurality of cellular telephones include an intelligent router unit, and wherein the intelligent router unit records the received location data in the routing table in the remote storage device coupled to the ad hoc wireless network and calculates the best route to transmit the one or more packets within the ad hoc wireless using the data in the routing table retrieved from the remote storage device.

9. The method of claim 4, wherein the ad hoc wireless network includes one or more cell base station servers and the plurality of cellular telephones.

10. A data processing system for routing packets in an ad hoc wireless network, comprising:
    a bus system;
    a storage device connected to the bus system, wherein the storage device includes a set of instructions; and
    a processing unit connected to the bus system, wherein the processing unit executes the set of instructions to broadcast location data to other nodes within the ad hoc wireless network in response to entering the ad hoc wireless network, receive location data from the other nodes within the ad hoc wireless network to form received location data, record the received location data in a routing table in a remote storage device coupled to the ad hoc wireless network, calculate a best route to transmit one or more packets within the ad hoc wireless network by retrieving the routing table from the remote storage device coupled to the ad hoc wireless network and using data in the retrieved routing table to form a calculated best route in response to determining that the one or more packets need to be transmitted, wherein the calculated best route comprises one of transmitting or relaying the one or more packets to a nearest mobile communications device within the ad hoc wireless network and transmitting or relaying the one or more packets over a route with a least amount of traffic, and transmit the one or more packets to a node within the ad hoc wireless network based on the calculated best route; and wherein the processing unit is the processing unit of a mobile communication device of a plurality of mobile communication devices within the ad hoc wireless network; and wherein each of the plurality of mobile communication devices broadcast the location data to each of the other nodes within the ad hoc wireless network in response to receiving a command from a user of the mobile communication device to transmit location data.

11. The data processing system of claim 10, wherein the processing unit executes a further set of instructions to determine if the one or more packets were received by the node and recalculate the best route to transmit the one or more packets within the ad hoc wireless network in response to determining that the one or more packets were not received by the node.

12. The data processing system of claim 10, wherein the ad hoc wireless network includes one or more cell base station servers and a plurality of cellular telephones; and wherein each of the plurality of cellular telephones broadcast the location data to each of the other nodes within the ad hoc wireless network on a predetermined time interval basis and in response to receiving a command from a user of the mobile communication device to transmit location data.

13. A non-transitory computer program product for routing packets in an ad hoc wireless network, the computer program product including:
    a computer readable storage medium; and
    a plurality of instructions stored in the computer readable medium configured to cause a processor to perform actions comprising:
        broadcasting location data to other nodes within the ad hoc wireless network in response to entering the ad hoc wireless network;

receiving location data from the other nodes within the ad hoc wireless network to form received location data;

recording the received location data in a routing table at a remote storage device coupled to the ad hoc wireless network;

calculating a best route to transmit one or more packets within the ad hoc wireless network by retrieving the routing table from the remote storage device coupled to the ad hoc wireless network and using data in the retrieved routing table to form a calculated best route in response to determining that the one or more packets need to be transmitted, wherein the calculated best route comprises one of transmitting or relaying the one or more packets to a nearest mobile communications device within the ad hoc wireless network and transmitting or relaying the one or more packets over a route with a least amount of traffic; and transmitting the one or more packets to a node within the ad hoc wireless network based on the calculated best route; and wherein the broadcasting, receiving, recording, calculating, and transmitting are performed by a mobile communication device of a plurality of mobile communication devices within the ad hoc wireless network; and wherein each of the plurality of mobile communication devices broadcast the location data to each of the other nodes within the ad hoc wireless network in response to receiving a command from a user of the mobile communication device to transmit location data.

14. The computer program product of claim 13, further comprising:

determining if the one or more packets were received by the node; and recalculating the best route to transmit the one or more packets within the ad hoc wireless network in response to determining that the one or more packets were not received by the node.

15. The computer program product of claim 14, wherein calculating the best route to transmit the one or more packets within the ad hoc wireless network using the data in the retrieved routing table to form the calculated best route and recalculating the best route to transmit the one or more packets within the ad hoc wireless network in response to determining that the one or more packets were not received by the node are executed on the fly to intelligently route the one or more packets as a topology of the ad hoc wireless network changes.

16. The computer program product of claim 13, wherein the mobile communication device is a cellular telephone, and wherein the cellular telephone is one of a plurality of cellular telephones within the ad hoc wireless network.

17. The computer program product of claim 16, wherein the plurality of cellular telephones include a global position system unit, and wherein the global position system unit provides the location data for the plurality of cellular telephones to broadcast to each of the other nodes within the ad hoc wireless network.

18. The computer program product of claim 17, wherein each of the plurality of cellular telephones broadcast the location data to each of the other nodes within the ad hoc wireless network on a predetermined time interval basis and in response to receiving a command from a user of the mobile communication device to transmit location data.

19. The method of claim 1, wherein the calculated best route comprises transmitting or relaying the one or more packets to the nearest mobile communications device within the ad hoc wireless network.

20. The method of claim 1, wherein the calculated best route comprises transmitting or relaying the one or more packets over a route with the least amount of traffic.

21. The method of claim 1, further comprising:

the mobile communication device receiving a monetary reward in response to the mobile communication device serving as a cell base station within the network.

22. The method of claim 1, wherein the location of the mobile communication device is determined by three or more other mobile communication devices within the network using a three point locating algorithm to triangulate the location of the mobile communication device.

23. The data processing system of claim 10, wherein the location of the mobile communication device is determined by three or more other mobile communication devices within the network using a three point locating algorithm to triangulate the location of the mobile communication device.

24. The computer program product of claim 13, wherein the location of the mobile communication device is determined by three or more other mobile communication devices within the network using a three point locating algorithm to triangulate the location of the mobile communication device.

* * * * *